United States Patent [19]

Debruin

[11] Patent Number: 5,879,017
[45] Date of Patent: Mar. 9, 1999

[54] PEDALING EFFICIENCY

[76] Inventor: Jeffery N. Debruin, 2652 Jerseyville Road West, Jerseyville, Ontario, Canada, L0R 1R0

[21] Appl. No.: 78,622

[22] Filed: May 14, 1998

[51] Int. Cl.⁶ .................................................... B62M 1/02
[52] U.S. Cl. ........................................... 280/259; 74/594.3
[58] Field of Search ................................ 280/252, 253, 280/256, 257, 259, 260, 261, 262; 74/560, 562, 594.1, 594.2, 594.3, 594.4

[56] References Cited

U.S. PATENT DOCUMENTS

| | | | |
|---|---|---|---|
| 571,753 | 11/1896 | Decker | 74/594.3 |
| 641,728 | 1/1900 | Robinson | 74/594.3 |
| 3,888,136 | 6/1975 | Lapeyre | 280/259 |
| 4,125,239 | 11/1978 | Berclaz et al. | 280/260 |
| 4,159,652 | 7/1979 | Trammell, Jr. | 280/259 |
| 4,281,845 | 8/1981 | Brown | 280/236 |
| 4,446,754 | 5/1984 | Chattin | 74/594.3 |
| 4,519,271 | 5/1985 | Chattin | 74/594.3 |
| 4,882,945 | 11/1989 | Trevizo | 74/594.1 |
| 5,172,926 | 12/1992 | Mannino | 280/256 |

FOREIGN PATENT DOCUMENTS

| | | | |
|---|---|---|---|
| 5-185980 | 7/1993 | Japan | 280/259 |

*Primary Examiner*—Kevin Hurley
*Assistant Examiner*—William R. Zimmerli

[57] ABSTRACT

A new bicycle with improved pedaling efficiency for allowing a length of crank arms to change during pedaling. The inventive device includes a pair of crank shafts secured to opposing ends of an existing sprocket shaft of a bicycle. Each of the crank shafts have an elongated slot extending a length thereof. Each of the crank shafts have a sliding bearing coupled with upper free ends thereof. Each of the sliding bearings have a roller disposed on a rear surface thereof. The rollers are coupled with a pair of circular races. The circular races each have a circular track for receiving the rollers therein. The circular races are coupled with the existing sprocket shafts of the bicycle. A pair of pedals are secured within the elongated slots of the pair of crank shafts. The pair of pedals have interior shaft portions secured to the sliding bearings.

2 Claims, 3 Drawing Sheets

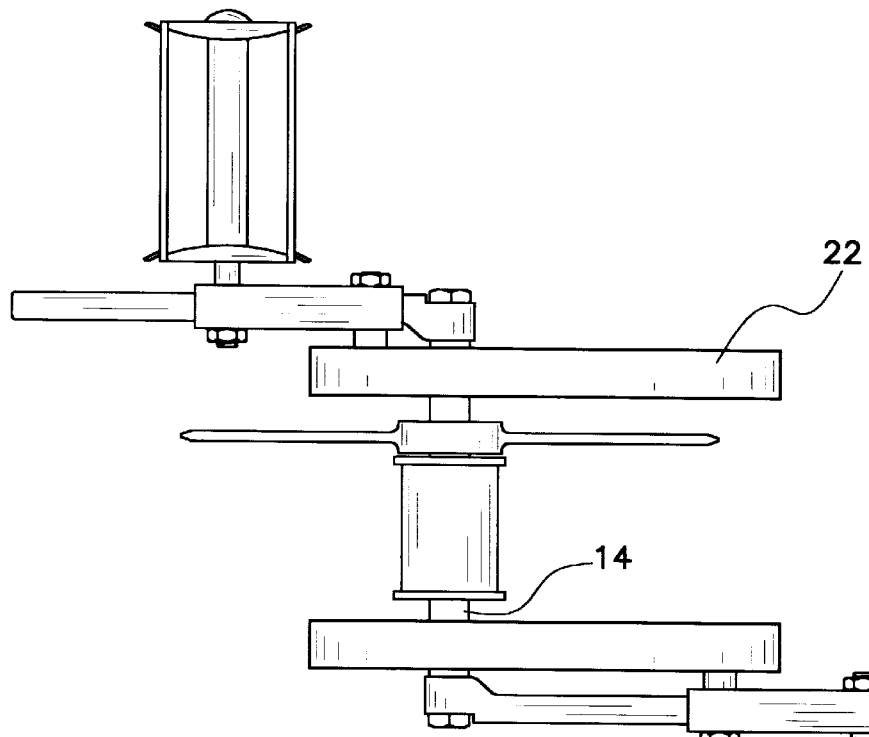
Fig.3
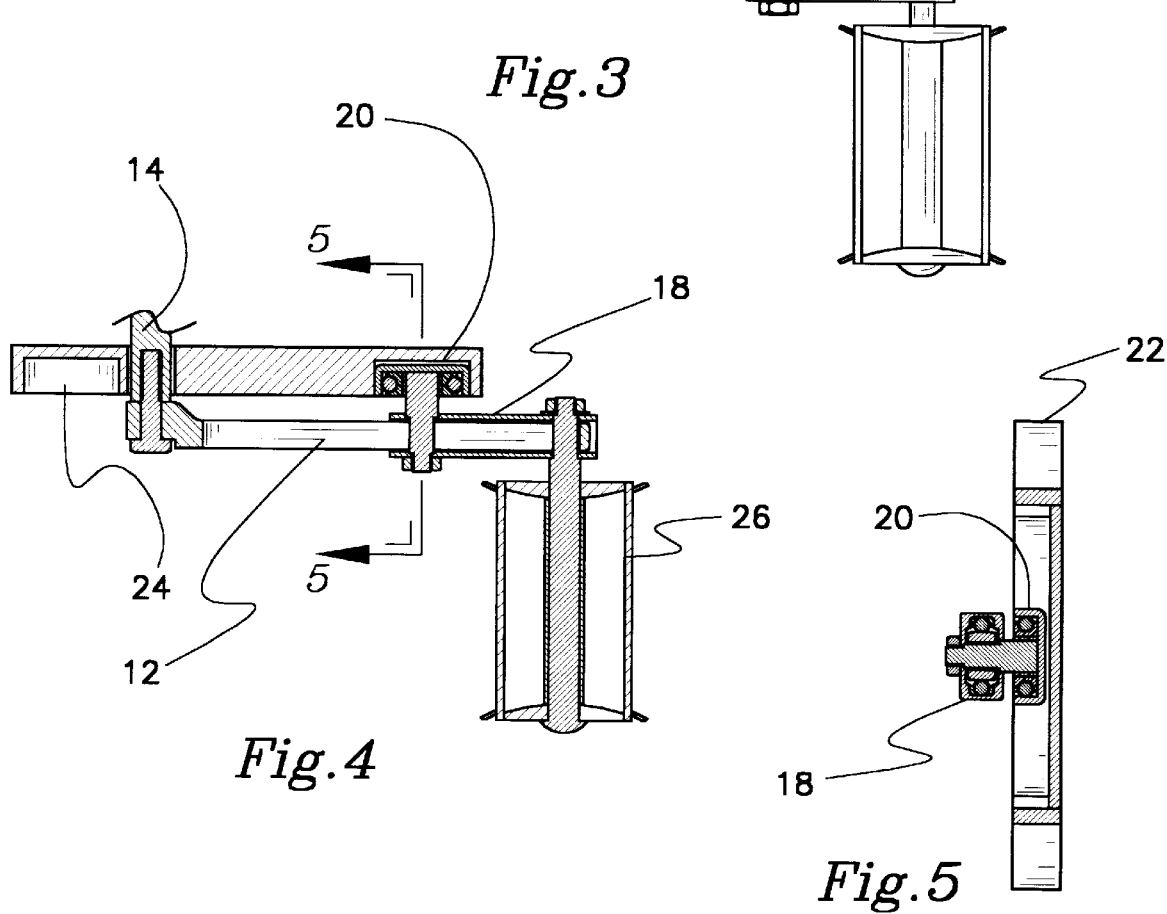
Fig.4
Fig.5

PEDALING EFFICIENCY

BACKGROUND OF THE INVENTION

1. Field of the Invention

The present invention relates to bicycle pedals and more particularly pertains to a new bicycle with improved pedaling efficiency for allowing a length of crank arms to change during pedaling.

2. Description of the Prior Art

The use of bicycle pedals is known in the prior art. More specifically, bicycle pedals heretofore devised and utilized are known to consist basically of familiar, expected and obvious structural configurations, notwithstanding the myriad of designs encompassed by the crowded prior art which have been developed for the fulfillment of countless objectives and requirements.

Known prior art bicycle pedals include U.S. Pat. No. 4,125,839 to Berclaz et al.; U.S. Pat. No. 5,095,772 to Fortson; U.S. Pat. No. 4,960,013 to Sander; U.S. Pat. No. 4,519,271 to Chattin; U.S. Pat. No. 610,175 to Flindall; Patent No. EP 0 166 843 to Carnielli; and Patent No. WO 89/09157 A1 to Paek.

While these devices fulfill their respective, particular objectives and requirements, the aforementioned patents do not disclose a new bicycle with improved pedaling efficiency. The inventive device includes a pair of crank shafts secured to opposing ends of an existing sprocket shaft of a bicycle. Each of the crank shafts have an elongated slot extending a length thereof. Each of the crank shafts have a sliding bearing coupled with upper free ends thereof. Each of the sliding bearings have a roller disposed on a rear surface thereof. The rollers are coupled with a pair of circular races. The circular races each have a circular track for receiving the rollers therein. The circular races are coupled with the existing sprocket shafts of the bicycle. A pair of pedals are secured within the elongated slots of the pair of crank shafts. The pair of pedals have interior shaft portions secured to the sliding bearings.

In these respects, the bicycle with improved pedaling efficiency according to the present invention substantially departs from the conventional concepts and designs of the prior art, and in so doing provides an apparatus primarily developed for the purpose of allowing a length of crank arms to change during pedaling.

SUMMARY OF THE INVENTION

In view of the foregoing disadvantages inherent in the known types of bicycle pedals now present in the prior art, the present invention provides a new bicycle with improved pedaling efficiency construction wherein the same can be utilized for allowing a length of crank arms to change during pedaling.

The general purpose of the present invention, which will be described subsequently in greater detail, is to provide a new bicycle with improved pedaling efficiency apparatus and method which has many of the advantages of the bicycle pedals mentioned heretofore and many novel features that result in a new bicycle with improved pedaling efficiency which is not anticipated, rendered obvious, suggested, or even implied by any of the prior art bicycle pedals, either alone or in any combination thereof.

To attain this, the present invention generally comprises a pair of crank shafts secured to opposing ends of an existing sprocket shaft of a bicycle. Each of the crank shafts have an elongated slot extending a length thereof. Each of the crank shafts have a sliding bearing coupled with upper free ends thereof. Each of the sliding bearings have a roller disposed on a rear surface thereof. The rollers are coupled with a pair of circular races. The circular races each have a circular track for receiving the rollers therein. The circular races are coupled with the existing sprocket shafts of the bicycle. A pair of pedals are secured within the elongated slots of the pair of crank shafts. The pair of pedals have interior shaft portions secured to the sliding bearings.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bicycle with improved pedaling efficiency apparatus and method which has many of the advantages of the bicycle pedals mentioned heretofore and many novel features that result in a new bicycle with improved pedaling efficiency which is not anticipated, rendered obvious, suggested, or even implied by any of the prior art bicycle pedals, either alone or in any combination thereof.

It is another object of the present invention to provide a new bicycle with improved pedaling efficiency which may be easily and efficiently manufactured and marketed.

It is a further object of the present invention to provide a new bicycle with improved pedaling efficiency which is of a durable and reliable construction.

An even further object of the present invention is to provide a new bicycle with improved pedaling efficiency which is susceptible of a low cost of manufacture with regard to both materials and labor, and which accordingly is then susceptible of low prices of sale to the consuming public, thereby making such bicycle with improved pedaling efficiency economically available to the buying public.

Still yet another object of the present invention is to provide a new bicycle with improved pedaling efficiency which provides in the apparatuses and methods of the prior art some of the advantages thereof, while simultaneously overcoming some of the disadvantages normally associated therewith.

Still another object of the present invention is to provide a new bicycle with improved pedaling efficiency for allowing a length of crank arms to change during pedaling.

Yet another object of the present invention is to provide a new bicycle with improved pedaling efficiency which includes a pair of crank shafts secured to opposing ends of an existing sprocket shaft of a bicycle. Each of the crank shafts have an elongated slot extending a length thereof. Each of the crank shafts have a sliding bearing coupled with upper free ends thereof. Each of the sliding bearings have a roller disposed on a rear surface thereof. The rollers are coupled with a pair of circular races. The circular races each have a circular track for receiving the rollers therein. The circular races are coupled with the existing sprocket shafts of the bicycle. A pair of pedals are secured within the elongated slots of the pair of crank shafts. The pair of pedals have interior shaft portions secured to the sliding bearings.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top view of the present invention.

FIG. 4 is a top view of the present invention shown in partial cross-section.

FIG. 5 is a cross-sectional view of the present invention as taken along line 5—5 of FIG. 4.

DESCRIPTION OF THE PREFERRED EMBODIMENT

Figure 1:
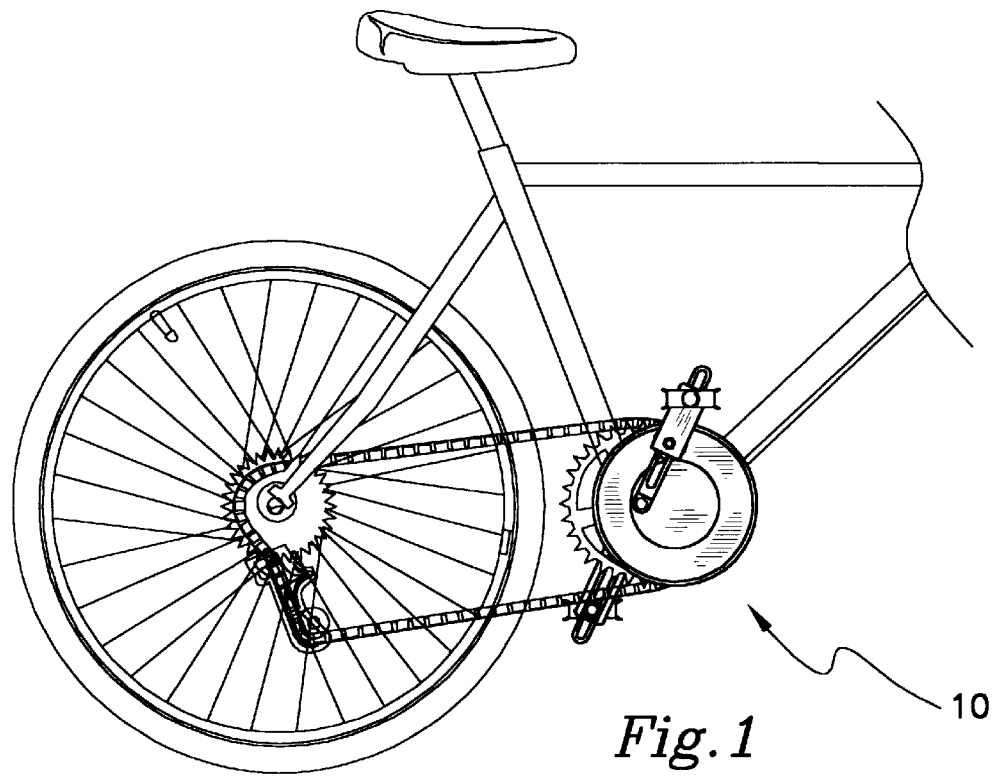
FIG. 1 is a side view of a new bicycle with improved pedaling efficiency according to the present invention.
Figure 2:
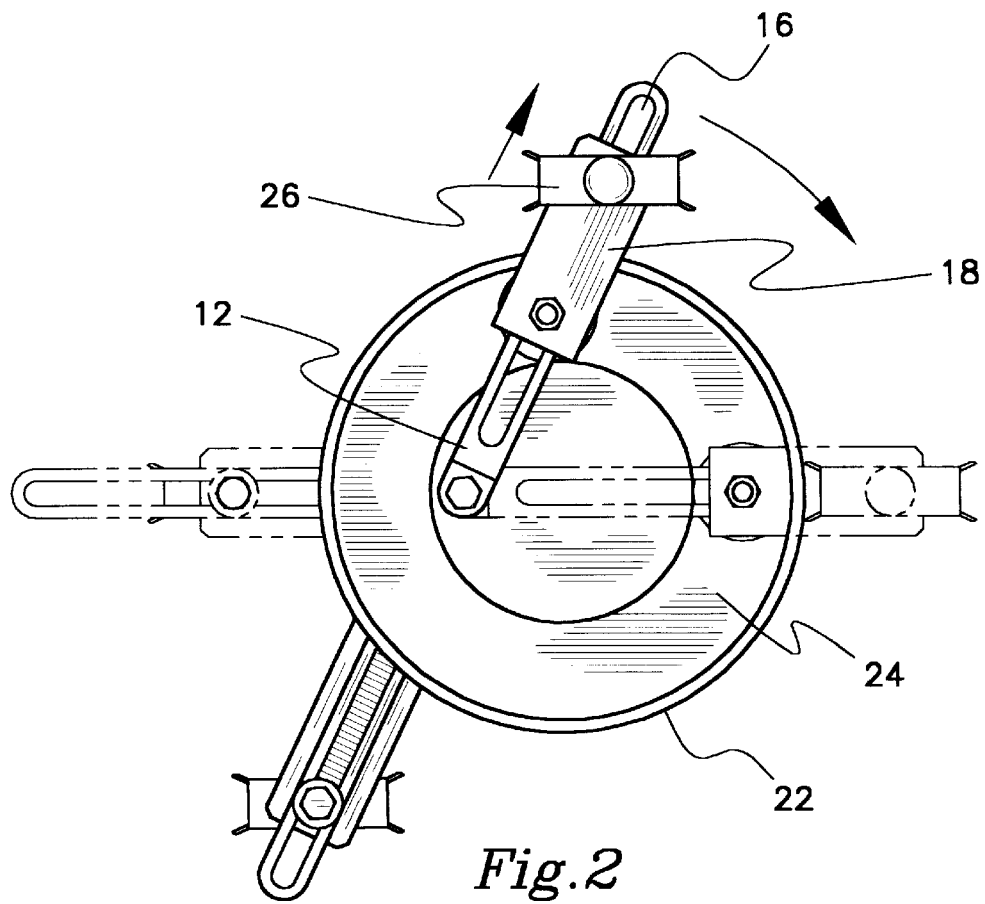
FIG. 2 is a sectional side view of the present invention.
Figure 6:
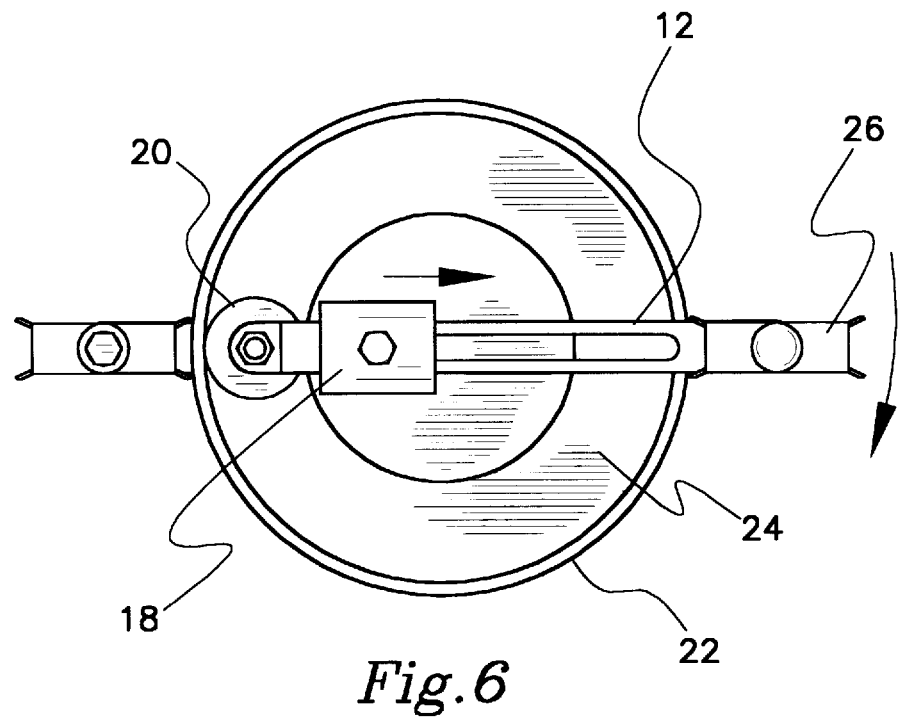
FIG. 6 is a side view of an alternate embodiment of the present invention.
Figure 7:
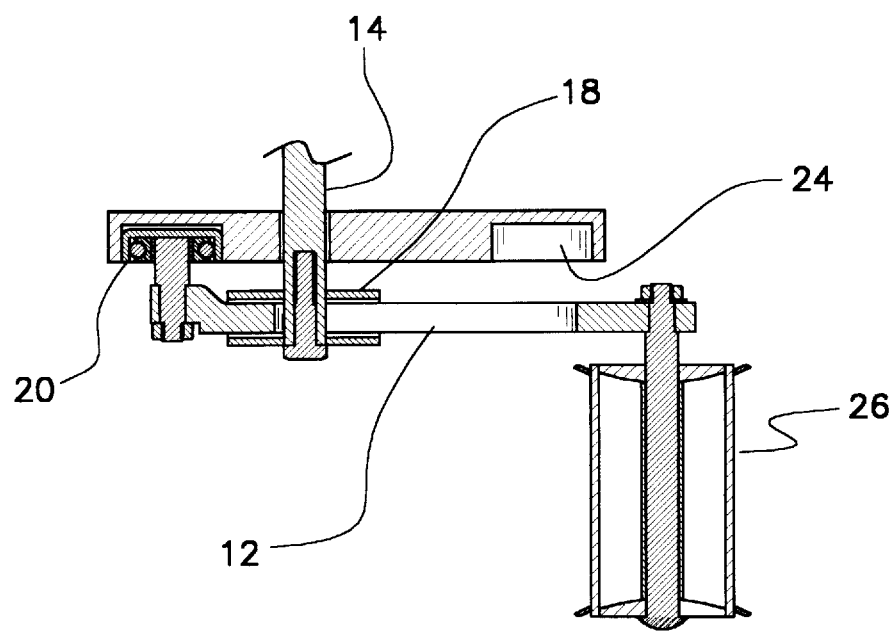
FIG. 7 is a top view of the alternate embodiment of the present invention.

With reference now to the drawings, and in particular to FIGS. 1 through 7 thereof, a new bicycle with improved pedaling efficiency embodying the principles and concepts of the present invention and generally designated by the reference numeral 10 will be described.

As best illustrated in FIGS. 1 through 7, the bicycle with improved pedaling efficiency 10 comprises a pair of crank shafts 12 secured to opposing ends of an existing sprocket shaft 14 of a bicycle. Each of the crank shafts 12 have an elongated slot 16 extending a length thereof. Each of the crank shafts 12 have a sliding bearing 18 coupled with upper free ends thereof. Each of the sliding bearings 18 have a roller 20 disposed on a rear surface thereof. The rollers 20 are coupled with a pair of circular races 22. The circular races 22 each have a circular track 24 for receiving the rollers 20 therein. The circular races 22 are coupled with the existing sprocket shafts 14 of the bicycle.

A pair of pedals 26 are secured within the elongated slots 16 of the pair of crank shafts. The pair of pedals 26 have interior shaft portions secured to the sliding bearings 18.

Alternately, the sliding bearing 18 could be fixed on the sprocket shaft 14, and the crank shafts 12 would slide back and forth through the sliding bearing 18. The rollers 20 would be mounted on the lower end of the crank shaft 12. Note FIGS. 6 and 7.

In use, the present invention would enable a bicyclist to go faster or climb a hill easier. The present invention allows the rider to change the gear ratio to match the riding conditions. The maximum efficiency occurs when the crank shafts 12 are parallel to the ground, and the rider is pushing down with one leg. The least efficient point occurs when the crank shafts 12 are vertical and the pedals 26 are moving horizontally. The present invention will vary the length of the crank shafts 12 to increase the torque during the most powerful part of the pedaling motion. As the pedal 26 turns, the length of the crank shaft 12 would increase as the pedal 26 moves forward and downward when pressure is applied. When the pedal 26 starts to move horizontally and the rear at the bottom of the motion, the crank shaft 12 would start to shorten and stay at a short length until the pedal 26 returns to the vertical position and starts to lengthen again as it is pushed downward. As a result, a rider would generate more power so that he could go faster without pedaling harder, and it would be easier to climb a hill.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new bicycle with improved pedaling efficiency for allowing a length of crank arms to change during pedaling comprising, in combination:

a pair of crank shafts secured to opposing ends of an existing sprocket shaft of a bicycle, each of the crank shafts having an elongated slot extending a length thereof, each of the crank shafts having a sliding bearing coupled with upper free ends thereof, each of the sliding bearings having a roller disposed on a rear surface thereof, the rollers being coupled with a pair of circular races, the circular races each having a circular track for receiving the rollers therein, the circular races being coupled with the existing sprocket shafts of the bicycle;

a pair of pedals secured within the elongated slots of the pair of crank shafts, the pair of pedals having interior shaft portions secured to the sliding bearings.

2. A new bicycle with improved pedaling efficiency for allowing a length of crank arms to change during pedaling comprising, in combination:

a pair of sliding bearings secured to opposing ends of an existing sprocket shaft of a bicycle a pair of crank shafts having an elongated slot extending a length thereof, each of the elongated slots slidably coupling with the sliding bearings, each of the crank shafts having a roller disposed on a lower end thereof, the rollers being coupled with a pair of circular races, the circular races each having a circular track for receiving the rollers therein, the circular races being coupled with the existing sprocket shafts of the bicycle;

a pair of pedals secured to the pair of crank shafts.

* * * * *